US005850056A

United States Patent [19]

Harwath

[11] Patent Number: 5,850,056

[45] Date of Patent: Dec. 15, 1998

[54] GROUNDING KIT FOR A TRANSMISSION LINE CABLE INCLUDING A CLIP, A BAIL AND A HOUSING

[75] Inventor: Frank A. Harwath, Downers Grove, Ill.

[73] Assignee: Andrew Corporation, Orland Park, Ill.

[21] Appl. No.: 635,524

[22] Filed: Apr. 22, 1996

[51] Int. Cl.[6] .......... H02G 7/00

[52] U.S. Cl. .......... 174/40 CC; 174/92; 174/78

[58] Field of Search .......... 174/92, 78, 40 CC, 174/135, 71 C; D8/336, 333, 303, 320; D13/154; 439/435, 574, 769; 248/72, 227.3, 230.1, 230.7, 231.81, 300

[56] References Cited

U.S. PATENT DOCUMENTS

| | | | |
|---|---|---|---|
| D. 352,221 | 11/1994 | Scholl | D8/315 |
| 1,171,779 | 2/1916 | Fleck | 248/213.4 |
| 1,246,325 | 11/1917 | Rohmer | 248/74.3 |
| 1,600,224 | 9/1926 | Grundy | 174/40 CC |
| 2,215,283 | 9/1940 | Adler | 174/40 CC |
| 3,015,467 | 1/1962 | Vieaux | 248/231.81 |
| 3,022,557 | 2/1962 | Logan | 24/17 R |
| 3,394,400 | 7/1968 | Lamons | 174/102 R |
| 3,521,842 | 7/1970 | Opperthauser | 248/74.2 |
| 3,728,472 | 4/1973 | Leuteritz et al. | 174/78 |
| 3,787,797 | 1/1974 | Kurz | 439/391 |
| 3,916,086 | 10/1975 | Gillemont et al. | 174/93 |
| 4,107,454 | 8/1978 | Jakobsen | 174/135 |
| 4,314,094 | 2/1982 | Smith | 174/78 |
| 4,477,865 | 10/1984 | Tsuyama | 362/396 |
| 4,548,376 | 10/1985 | DeGore | 248/205.4 |
| 4,831,346 | 5/1989 | Brooker et al. | 333/260 |
| 5,006,669 | 4/1991 | Bachel et al. | 174/93 |
| 5,281,761 | 1/1994 | Woo et al. | 174/78 |

FOREIGN PATENT DOCUMENTS

| | | | |
|---|---|---|---|
| 1042526 | 11/1978 | Canada | 174/78 |
| 0 794 734 | 9/1958 | United Kingdom | H02F 38/01 |
| 2 232 020 | 11/1990 | United Kingdom | H01R 4/64 |
| 2277207 A | 10/1994 | United Kingdom . | |
| 2 289 579 | 11/1995 | United Kingdom | H01R 4/64 |

OTHER PUBLICATIONS

Andrew Catalog 35, Systems Planning Product Specifications Services, Grounding Kits, Heliax Elliptical Waveguide, p. 190, 1991.

Andrew Catalog 35, Systems Planning Product Specifications Services, Grounding Kits, Heliax Coaxial Cable Accessories, p. 418, 1991.

RFS Kabelmetal Radio Frequency Systems, Div. of Kabelmetal Electro GmbH, Edition 1, HSE Grounding Kit For Cellflex Cables (4 pages), 1992.

*Primary Examiner*—Bot L. Ledynh
*Assistant Examiner*—Kamand Cuneo
*Attorney, Agent, or Firm*—Arnold White & Durkee

[57] ABSTRACT

A grounding kit for a transmission line cable having a portion of its outer jacket removed to reveal an exposed section of its conductor is set forth. The grounding kit includes a clip, a bail and a housing. The clip has a fulcrum portion and means for connecting the clip to a ground wire. The clip encompasses a part of the exposed section of the conductor. The bail includes a mounting element pivotably mounted on the fulcrum portion of the clip to permit rotation of the bail between an open position and a closed position. The handle contacts the clip and forces the clip into clamping engagement with the exposed section of the conductor in response to the bail being rotated to the closed position. The hollow housing has an opening at both ends and an exit port. The housing encompasses and seals the clip, the bail and the exposed conductor. The transmission line cable on either side of the exposed section exits the hollow housing through its end openings while the grounding wire exits the hollow housing through the exit port.

58 Claims, 3 Drawing Sheets

GROUNDING KIT FOR A TRANSMISSION LINE CABLE INCLUDING A CLIP, A BAIL AND A HOUSING

FIELD OF THE INVENTION

This invention relates generally to transmission line cable and, more particularly, to an electrical grounding kit which grounds the transmission line cable.

BACKGROUND OF THE INVENTION

Transmission line cable often must be grounded whether it is coaxial cable or a waveguide. Grounding minimizes the damage that occurs when the cable is subjected to a high energy condition such as during a lightning strike. When the cable is used for applications where it is coupled to devices disposed on highly elevated structures, such as television transmission antennas, the likelihood of being struck by lightning is increased.

Grounding is typically accomplished by maintaining electrical contact between a ground wire and the outer conductor of the coaxial cable or the conductor of the waveguide. However, because these cables are used in various environmental conditions, merely removing a portion of the outer jacket of the cable to expose the conductor and making contact thereon is not practical. The conductor must be protected from the environment at the point where the ground wire contacts the outer conductor to inhibit corrosion.

Because grounding kits are designed for high current conditions, a high contact pressure must be maintained between the conductor and the ground wire. A high contact pressure is also needed to maintain contact between the conductor and the ground wire during lightning strikes where strong magnetic fields tend to repel these pieces from one another. To maintain high contact pressure, devices have been used which clamp onto the conductor of the cable. For example, copper straps or copper braided wires are wrapped around the conductor and are tightened thereon. The ground wire is then attached to the strap or the braided wires. These devices often require the use of additional tools during installation which is not desirable since it is advantageous to minimize the items needed by the installer of the grounding device. Also, these devices can loosen over an extended period of time due to stress relaxation, or creep. The stress relaxation problem can be further aggravated by exposure to varied temperatures. Additionally, these copper straps and braided wires may become dislodged after a lightning strike. Thus, they must be tested and, possibly replaced, after such a condition.

Tapes are often used to seal the exposed conductor after the ground wire is attached regardless of the method of attachment. Often, multiple types of tape are needed to provide the proper environmental seal. For example, sealing procedures may call for one wrap of butyl tape followed by one wrap of vinyl tape. Not only are the rolls of tape cumbersome for the installer to carry, but the process of properly wrapping the cable can be time consuming. When the taping of a cable is performed in harsh environmental conditions where the installer is uncomfortable, the integrity of the taping process may be compromised which affects its sealing characteristics.

Therefore, a need exists for a durable grounding kit for transmission line cables that maintains high contact pressure with the cable over extended periods of time and after being subjected to multiple high-power conditions. Furthermore, a need exists for a sealing device that provides a reliable seal over the exposed section of the cable to which the ground wire is attached.

SUMMARY OF THE INVENTION

A kit for grounding a conductor of a transmission line cable includes a clip, a bail, and housing. The cable has a portion of its outer jacket removed revealing an exposed section of the conductor. The clip has a fulcrum portion and is coupled to the grounding wire. The clip generally has a C-shape and encompasses a part of the exposed section of the conductor.

The bail includes a mounting element that is pivotably mounted on the fulcrum portion of the clip to permit rotation of the bail between an open position and a closed position. In the closed position, the bail contacts the clip so as to force the clip into tight engagement with the exposed section of the conductor.

The hollow housing is generally cylindrical and includes an opening at both ends and an exit port. The housing has an axial seam along its length which allows it to be temporarily opened so as to insert the housing over the clip, the bail and the cable. Once these components are inserted, the housing maintains the clip, the bail and the exposed conductor in a sealed environment. The transmission line cable on either side of the exposed section exits the hollow housing through the openings. The ground wire, which is attached to the clip, exits the hollow housing through the exit port.

The bail is rotated into its closed position with minimal effort by the installer thereby forcing the clip into tight engagement with the outer conductor. The tight engagement between the clip and the conductor of the cable ensures high-pressure electrical contact as required when a high-power condition occurs in the cable from a lightning strike. And to inhibit corrosion, the housing provides a sealed environment for the clip and bail assembly attached to the conductor. With the exception of the stripping tool that is used to expose the conductor, the entire grounding kit can be installed onto the cable without the assistance of any tools.

The above summary of the present invention is not intended to represent each embodiment, or every aspect, of the present invention. This is the purpose of the figures and the detailed description which follow

BRIEF DESCRIPTION OF THE DRAWINGS

Other objects and advantages of the invention will become apparent upon reading the following detailed description and upon reference to the drawings in which.

Figure 1:
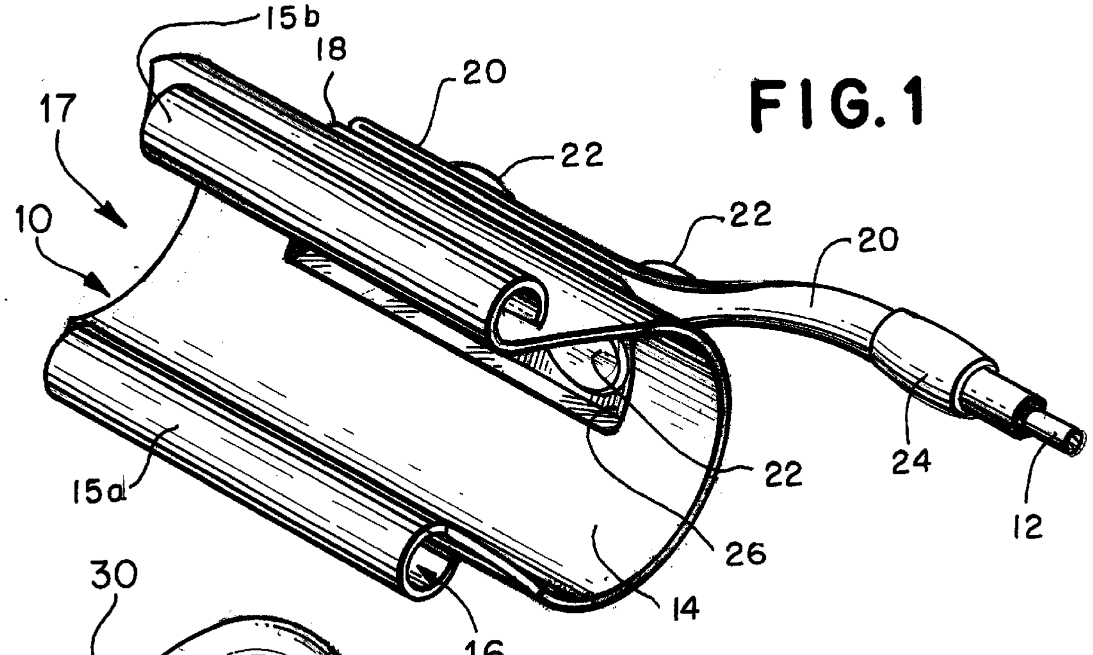
FIG. 1 is an isometric view of the clip of the claimed invention.

While the invention is susceptible to various modifications and alternative forms, a specific embodiment thereof has been shown by way of example in the drawings and will herein be described in detail. It should be understood, however, that it is not intended to limit the invention to the particular forms disclosed the contrary. The intention is to cover all modifications, equivalents, and alternatives falling within the spirit and scope of the invention as defined by the appended claims.

DETAILED DESCRIPTION OF THE INVENTION

Referring initially to FIG. 1, a clip 10 is coupled to a ground wire 12 that is connected directly, or indirectly, into the ground. The clip 10 includes an inner surface 14 which, as shown in FIGS. 5–8, abuts an outer conductor of a coaxial cable. The inner surface 14 also can abut a conductor on a waveguide. For simplicity, however, the invention is described with reference to only a coaxial cable since the only structural difference between the two cables is that the waveguide lacks an inner conductor. The clip 10 has two folded portions 15*a* and 15*b* each of which defines a cylindrical cavity. The cylindrical cavities are actually fulcrums 16 in that they provide a pivotable mount for the bail shown in FIG. 2. The two folded portions 15*a* and 15*b* define an axial opening 17 therebetween through which the coaxial cable is inserted. The two folded portions 15*a* and 15*b* assist in smoothly guiding the clip 10 over the coaxial cable.

A substantially flat embossment 18 (shown in more detail in FIG. 4) is disposed on the back of the clip 18 and is the surface to which the ground wire 12 is coupled. The ground wire 12 is attached to the embossment 18 via a conductive tube 20. The conductive tube 20 is flattened at one end which includes two holes through which two rivets 22 pass to provide connection to the embossment 18. Multiple rivets 22 are preferred because they prohibit rotation of the tube 20 around the clip 10 which may occur during a high-energy condition where the tube 20 may repel the clip 10. The ground wire 12 is inserted to the end of the conductive tube 20 which is then crimped at location 24 to maintain contact between the tube 20 and the ground wire 12.

Because the rivets 22 extend through the embossment 18, the embossment 18 is displaced in the radial direction away from the center of the clip 10 to create a recess 26. The portions of the rivets 22 which extend through the embossment 18 are disposed within the recess 26.

In addition to the rivets 22, the conductive tubing 20 can be made integral with the clip 10 through other processes. For example, the conductive tubing 20 can be attached to the clip 10 through brazing or ultrasonic bonding. Furthermore, the ground wire 12 itself can be directly attached to the clip 10 via brazing or other common methods.

The clip 10 is preferably made of a high performance, high conductive copper alloy. For example, the clip 10 can be made of copper 151, copper 110, or copper 143. The clip 10 is made from a sheet with a thickness that is typically between 0.020 inch and 0.050 inch. The rivets 22 are also preferably made from a cuprous material as is the conductive tube 20. Consequently, the electrical resistance between the inner surface 14 of the clip 10 and the ground wire 12 is minimal due to the utilization of the cuprous materials.

Figure 2:
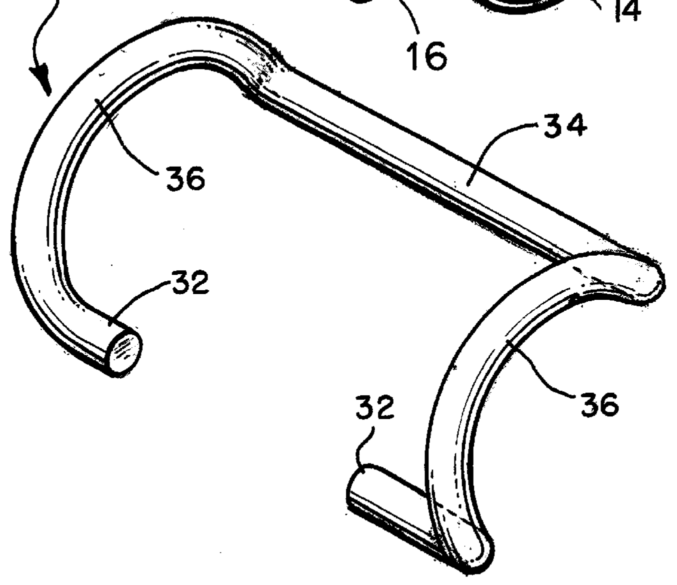
FIG. 2 is an isometric view of the bail of the claimed invention.

FIG. 2 illustrates a bail 30 that is used in conjunction with the clip 10 of FIG. 1. The bail 30 includes two arms 32 which act as mounting elements that are inserted into the fulcrum 16 of the clip 10. A central member 34 of the bail 30 is connected to the arms 32 via two curved members 36. As is discussed below, the central member 34 acts as a handle during the installation procedure assisting the installer in forcing the bail 20 over the clip 10, and pulling the clip 10 over the coaxial cable.

Figure 5:
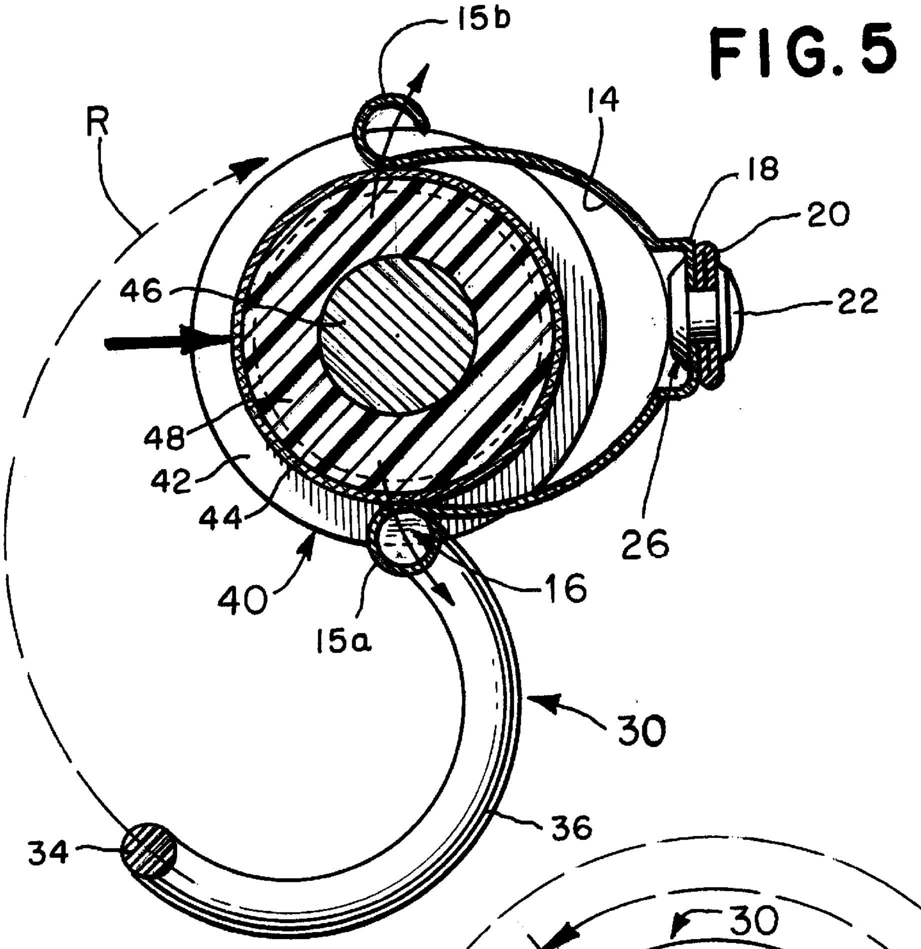
FIG. 5 is a cross section of the clip and bail assembly in the process of being applied to a coaxial cable with the bail in the open position.
Figure 6:
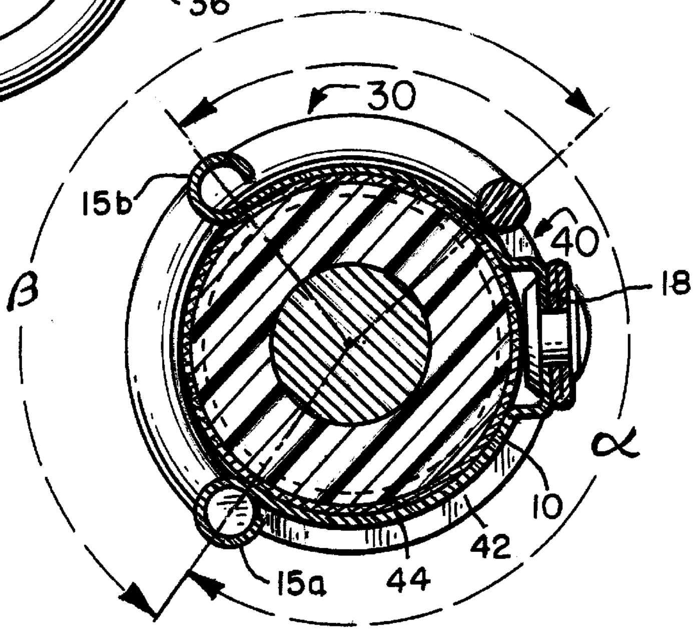
FIG. 6 is a cross section of the clip and bail assembly attached to a coaxial cable with the bail in the closed position.

The bail 30, as is shown in detail in FIGS. 5 and 6, acts as a spring to force the clip 10 into tight, clamping engagement with the coaxial cable. Thus, the bail 30 is made from a material that experiences minimal creep in that it deforms at a slow rate while subjected to forces over an extended period of time. Also, the material of the bail 30 is temperature resistant since intense heat and, consequently elevated temperatures, are encountered during a lightning strike. Thus, the bail 30 can be made of various types of steel including the 300 and 400 series stainless steels. Stainless steel is preferable in that it is unlikely to corrode. If other steels are used, those steels may need to be plated with a corrosion-resistant material such as nickel.

Figure 3:
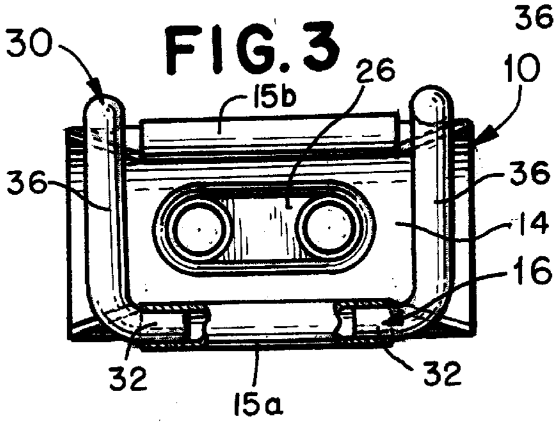
FIG. 3 is a side elevation view of the clip and bail assembly.
Figure 4:
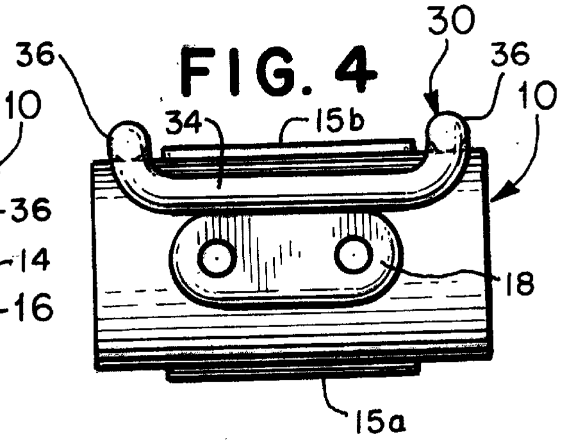
FIG. 4 is a second side elevation view of the clip and bail assembly.

FIGS. 3 and 4 illustrate the assembly of the clip 10 on the bail 30 from the front and the back, respectively, with the tube 20 unattached. FIG. 3 shows the inner surface 14 of the clip 10 through the axial opening 17 between the two folded portions 15*a* and 15*b*. The arms 32 of the bail 30 are inserted into the fulcrum 16 defined by the lower folded portion 15*a*. FIGS. 3 and 4 illustrate the bail 30 in a closed position wherein the curved members 36 have been rotated about the pivotable mount and extend across the axial opening 17 of the clip 10. The recess 26 is centered on the clip 10.

FIG. 4 illustrates the embossment 18 on the back side of the clip 10. The central member 34 of the bail 30 is adjacent the embossment 18 as the curved members 36 of the bail 30 extend around the clip 10. The lower folded portion 15*a* defines the fulcrum 16 into which the arms 32 of the bail 30 are inserted. The embossment 18 is located directly behind the recess 26 shown in FIG. 3.

FIGS. 5 and 6 illustrate the method by which the clip 10 and bail 30 are inserted over a coaxial cable 40. The coaxial cable 40 includes a jacket 42 which protects an outer conductor 44 and an inner conductor 46. Typically, the outer conductor 44 is separated from the inner conductor 46 by an insulator 48. The inner conductor 46 may be solid or hollow. The outer conductor 44 may be smooth or it may be corrugated. The corrugations may be annular in that one corrugation joins itself, or helical where one or multiple corrugations extend along the axial length of the outer conductor 44 in a screw-like configuration. The outer conductor 44 shown here is annularly corrugated and the cross-sections in FIGS. 5 and 6 are through a peak of one of the annular corrugations such that the troughs of the corrugations are shown in dashed lines.

In FIG. 5, the jacket 42 has been removed along an axial length of the coaxial cable 40 (e.g. 2–3 inches) revealing an exposed section of the outer conductor 44. The clip 10, which has a C-shaped cross-sectional profile, is pressed over the outer conductor 44 as the rounded surfaces of the two folded portions 15*a* and 15*b* engage the outer conductor 44. The rounded surfaces inhibit any gouging of the outer conductor 44 since no sharp edges are exposed. The clip 10 is not positioned over the jacket 42; the inner surface 14 is in contact only with the outer conductor 44. With its C-shape, the clip 10 acts like a spring by returning to its original position after the conductor 44 of the coaxial cable 40 has passed through the axial opening 17. An arrow R illustrates the rotation of the bail 30 around its arms 32 which are mounted in the fulcrum 16 of the clip 10. It also should be noted that the central member 34 acts as a handle to assist the installer in pulling the clip 10 over the outer conductor 44.

FIG. 5 also illustrates the rivets 22 extending through the flattened conductive tube 20 and the embossment 18. The backsides of the rivets 22 do not extend beyond the inner surface 14 of the clip 10 so as to allow a smooth interface between the inner surface 14 of the clip 10 and the outer conductor 44.

FIG. 6 illustrates the bail 30 in closed position in which the bail 30 forces the inner surface 14 of the clip 10 into tight, clamping engagement around the outer conductor 44. The inner surface 14 of the clip 10 has a diameter that is slightly less (e.g. from about 0.005 inch to about 0.050 inch) than the outer diameter of the outer conductor 44. Thus, once the clip 10 is on the outer conductor 44, it rests tightly against the outer conductor 44. The bail 30 acts to further secure the clip 10 on the outer conductor 44 and maintain tight engagement over an extended period of time.

As can be seen, the clip 10 encompasses and contacts only a part of the outer conductor 44 in the circumferential direction. Angle $\alpha$, which illustrates the contact angle of the clip 10, is in the range from about 215° to about 290° so that approximately 60% to 80% of the outer conductor 44 is in contact with the clip 10. The angle $\alpha$ is dependent on the material and thickness of clip 10 which dictate the resistance of the clip 10 to the bending which occurs during installation. In the preferred embodiment, angle $\alpha$ is approximately 260° when the clip 10 is made from a 0.025 inch sheet of copper 151.

To maintain the clip 10 against the outer conductor 44, the curved members 36 of the bail 30 engage the clip 10. The curved members 36 are spaced from each other by an amount that does not allow the upper folded portion **15*b* of the clip 10 to interfere with the rotation of the bail 30 (see FIG. 4). The central member 34 also engages the clip 10 near the embossment 18. Angle $\beta$, which illustrates the contact angle of the bail 30 on the clip 10, is in the range from about 180° to about 210°. The angle $\beta$ should be larger than 180° to ensure the bail 30 does not slide off the clip 10**. In the preferred embodiment, the angle $\beta$ is approximately 190°.

Figure 7:
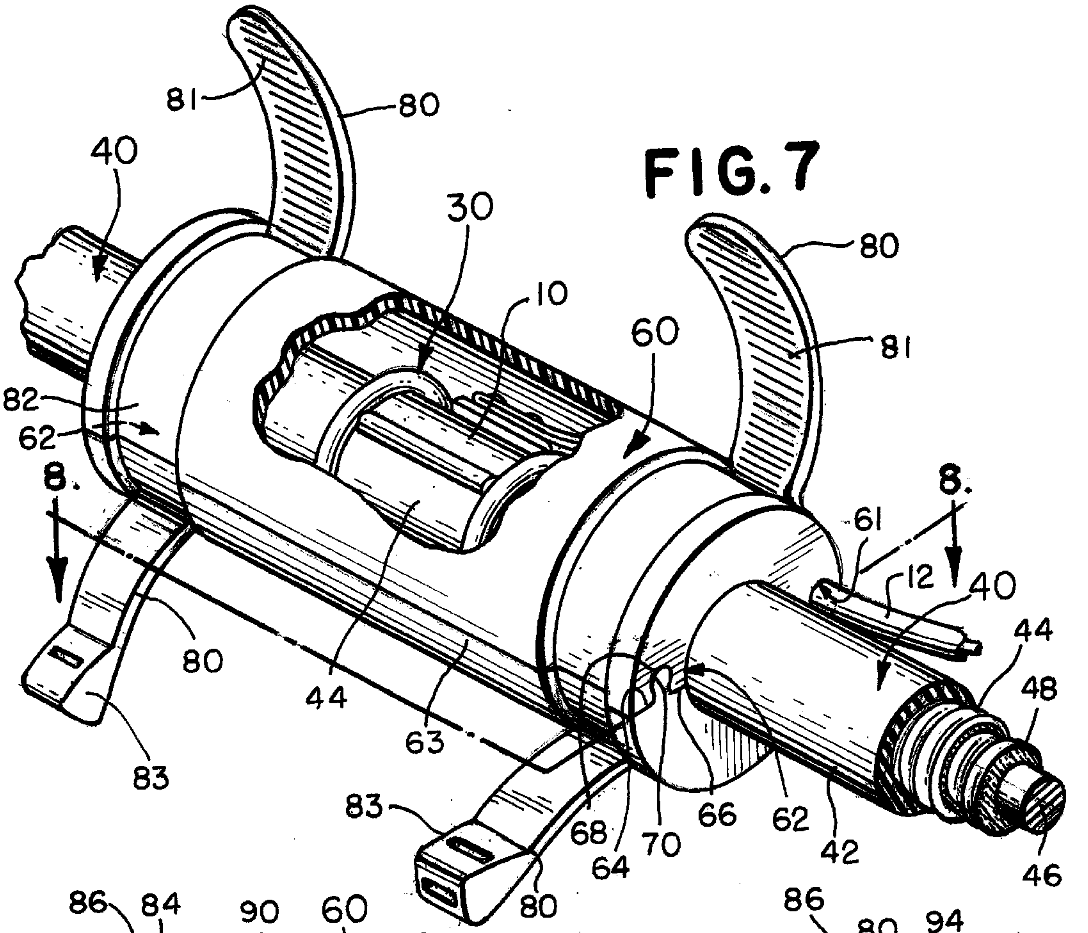
FIG. 7 is an isometric of the grounding kit showing the clip and bail assembly attached to the coaxiaable and being enclosed by the hollow housing which is partially broken away.

FIG. 7 illustrates a generally cylindrical housing 60, partially broken away, that encloses the assembly of the clip 10 and the bail 30. The housing 60 is typically made from an elastomer with a durometer hardness in the range from about 50 to 75. The housing 60 is, in essence, hollow to accommodate the coaxial cable 40 extending therethrough and the assembly of the clip 10 and bail 30 attached on the exposed section of the outer conductor 44. An opening 62 is located at each end where the coaxial cable 40 on either side of the exposed section of the outer conductor 44 exits the housing 60. The housing 60 also includes an exit port 61 where the ground wire 12 departs from the housing 60. The exit port 61 can be placed on any surface of the housing 60, but is preferably adjacent one of the coaxial cable openings 62 at the ends of the housing 60.

The housing 60 has a seam 63 along its axial length which can be opened to form a gap that allows the coaxial cable 40, the bail 30 and the clip 10 to be inserted therein. The axial seam 63 forms two opposing surfaces 64 and 66 having a groove 68 and a projection 70, respectively, in the axial direction. The groove 68 and the projection 70 mate to provide a seal after the housing 60 is wrapped around the coaxial cable 40 and the assembly of the clip 10 and bail 30.

Although the groove 68 and projection 70 provide some retaining force to keep the seam 63 from opening, the housing 60 is also equipped with a pair of straps 80 disposed in two circumferential channels 82. Each strap 80 is of a type commonly known with a series of grooves 81 at one end and a catch member 83 at the other. The grooves 81 and catch member 83 act like a ratcheting mechanism in that the end with the grooves 81 can be pulled through the catch member 83 in one direction to tighten the strap 80 around the channels 82 of the housing 60 and maintain the seam 63 in a closed position.

Figure 8:
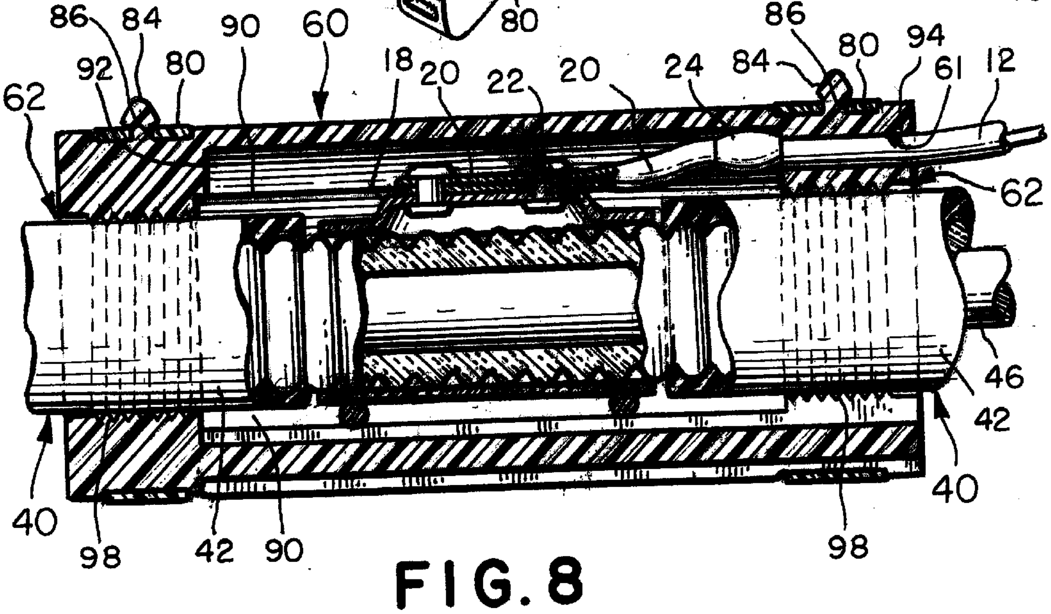
FIG. 8 is a cross section of the grounding kit showing the clip and bail assembly attached to the coaxial cable and being enclosed by the hollow housing.

Each strap 80 is permanently maintained in its respective channel 82 by a resilient lug 84 which is shown in FIG. 8. The resilient lug 84 has the shape of a Christmas tree with a thin stem portion at its base which is connected to a wide structure that gradually decreases to a point. at the top. The lugs 84 are typically made integral with the housing 60. Each strap 80 has a hole 86 into which the lug 84 is inserted until the hole 86 passes over the wide structure and rests at the thin stem. Consequently, the straps 80 remain attached to the housing 60.

In addition to the straps 80 described above, the housing 60 could be sealed by other devices in the channels 82. For example, tape can also maintain the seam 63 of the housing 60 in a closed position, although it results in less compressive force around the circumference due to the wrapping manner in which type is installed. Wire or rope that can be tied in a knot could also be used although it is not as easy to install as the straps 80.

FIG. 8 is a cross section taken along the axial length of the housing 60 revealing the internal surface 90 of the hollow housing 60. To accommodate the ground wire 12, the embossment 18, the flattened end of the conductive tubing 20, and the rivets 22, the housing 60 includes a chamber 92 which intersects the internal surface 90.

FIG. 8 also reveals the route of the ground wire 12 exiting the housing 60. Cylindrical wall 94, which defines the exit port 61, intersects the chamber 92 of the housing 60. The crimp 24 of the conductive tubing 22 typically resides within the chamber 92 and does not extend into the exit port 61. Preferably, the wall 94 of the exit port 61 is slightly less than the outer diameter of the ground wire 12 for sealing purposes, and also for installation purposes which are delineated below.

Near each of the openings 62 at the ends of the housing 60 is a grooved wall 98. The grooved walls 98 provide sealing around the jacket 42 of the coaxial cable 40. The series of grooves is, in essence, a series of barriers between the ambient environment and the sealed environment within the housing 60. The series of resilient grooves on the grooved walls 98 also allow coaxial cables 40 having jackets 42 with varying outer diameters to be properly sealed. The variations in outer diameter may simply be due to the cumulative effect of the tolerance build-up on one coaxial cable 40.

The housing 60 also is the package for the assembly of clip 10, bail 30, and ground wire 12 prior to its installation. The clip 10 and bail 30 are attached with the arms 32 of the bail 30 mounted within the fulcrum portion 16 of the clip 10. The conductive tube 20 is attached to the embossment 18 by the rivets 22. The ground wire 12 is crimped into the conductive tube 20. The ground wire 12 typically has a fixed length (e.g. 2–3 feet) permitting attachment to a main grounding element, usually the tower frame. The ground wire 12 is then inserted through the exit port 61 so that the bail 30 and clip 10 are enclosed by the internal surface 90 of the housing 60. The seam 63 does not have to be sealed for the package to be effective, although it may be. The press fit connection between the ground wire 12 and walls 94 of the exit port 61 secures the bail 30 and the clip 10 within the housing 60.

The installer of the entire environmentally-sealed grounding kit merely carries this kit with him or her to the sight where the grounding is needed. After using a stripping tool to expose the outer conductor 44 of the coaxial cable 40, the installer opens the seam 63, if it is not already opened, pulls the clip 10 and bail 30 from the housing 60, pushes the clip 10 over the outer conductor 44, rotates the bail 30 to the closed position, inserts the bail 30 and the clip 10 back into the housing 60, mates the projection 70 into the groove 68, and fastens the ratcheting mechanisms of the straps 80 so that they tightly embrace the housing 60. No additional tools are need beyond the stripping tool.

Although the assembly of the bail 30 and the clip 10 have been described in conjunction with the housing 60, the clip and bail assembly and the housing 60 can be used with current components which ground coaxial cables 40. For example, the bail 30 and clip 10 with the ground wire 12 attached thereto can be sealed with tape after it is installed onto the outer conductor 44. Alternatively, the bail 30 and clip 10 may be enclosed by a thin insulative shield (e.g. plastic or elastomer). The shield may then be fully sealed on the coaxial cable 40 with tape.

On the other hand, the copper straps and copper braided wire assemblies currently in the market may be used in conjunction with the housing 60. The internal surface 92 of the housing 60 accommodates these straps or braided wires. The exit port 60 allows the ground wire attached to the braided wire or the strap to exit from the housing 60.

Each of these embodiments and obvious variations thereof is contemplated as falling within the spirit and scope of the invention, which is set forth in the following claims.

What is claimed is:

1. A kit for electrically grounding a transmission line cable, said cable having a portion of its outer jacket removed revealing an exposed section of an electrical conductor, said cable grounding kit comprising:

- a grounding clip having a fulcrum portion and means for connecting said grounding clip to a ground wire, said grounding clip encompassing a part of said exposed section of said electrical conductor;
- a bail having a mounting element pivotably mounted on said fulcrum portion of said grounding clip for permitting rotation of said bail between an open position and a closed position, said bail contacting said grounding clip and forcing said grounding clip into clamping engagement with said exposed section of said electrical conductor in response to said bail being rotated to said closed position; and
- a hollow housing having two ends, an opening at each of said two ends and an exit port, said hollow housing enclosing said grounding clip and said bail engaged on said electrical conductor, said cable on either side of said exposed section exiting said hollow housing through said openings, said ground wire exiting said hollow housing through said exit port.

2. The cable grounding kit of claim 1, wherein said grounding clip has a C-shaped cross-sectional profile.

3. The cable grounding kit of claim 2, wherein said grounding clip encompasses from about 60% to 80% of said electrical conductor in the circumferential direction.

4. The cable grounding kit of claim 1, wherein said connecting means includes a substantially flat embossment, displaced in the radial direction, from said electrical conductor to which said grounding wire is coupled.

5. The cable grounding kit of claim 4, wherein said connecting means further includes a tube and at least two rivets, said rivets connecting a flattened portion of said tube to said embossment, said grounding wire being crimped into one end of said tube.

6. The cable grounding kit of claim 1, wherein said grounding clip has an inner diameter and said electrical conductor of said cable has an outer diameter, said inner diameter of said grounding clip being less than said outer diameter of said electrical conductor.

7. The cable grounding kit of claim 1, wherein said fulcrum portion of said grounding clip includes a cylindrical cavity and said mounting element of said bail includes two arms, each of said arms being inserted into a corresponding end of said cylindrical cavity.

8. The cable grounding kit of claim 1, wherein said grounding clip is made of a material selected from the group consisting of copper 151, copper 110, and copper 143.

9. The cable grounding kit of claim 1, wherein said hollow housing further includes grooved surfaces adjacent to each of said openings, said grooved surfaces for gripping said outerjacket of said cable.

10. The cable grounding kit of claim 1, wherein said hollow housing includes a seam extending along the axial length thereof providing for a gap, said gap for inserting said cable, said bail and said grounding clip into said hollow housing.

11. The cable grounding kit of claim 10, wherein said seam creates two opposing surfaces, one of said two opposing surfaces including a projection while the other of said two opposing surfaces including a groove, said projection for inserting into said groove to join said two opposing surfaces.

12. The cable grounding kit of claim 1, wherein said bail has a C-shaped side profile, said C-shaped profile of said bail extending in the range from about 180° to about 210° around said electrical conductor.

13. The cable grounding kit of claim 12, wherein said C-shaped side profile of said bail has an inner diameter and said grounding clip has an outer diameter, said inner diameter of said bail being approximately the same as said outer diameter of said grounding clip.

14. The cable grounding kit of claim 1, wherein said bail includes a handle, said handle being disposed on said bail away from said mounting element, said handle capable of being rotated to effectuate the transition between said open position and said closed position.

15. The cable grounding kit of claim 14, wherein said bail has curved members extending from said mounting element to said handle, said curved members having substantially the same curvature as the outer surface of said electrical conductor, said curved members forcing said grounding clip into clamping engagement with said electrical conductor.

16. The cable grounding kit of claim 10, wherein said housing further includes a clamping means, said clamping means extending around said housing and maintaining said seam in a closed position to seal said grounding clip, said bail, and said electrical conductor.

17. The cable grounding kit of claim 1, wherein said cable grounding kit is adapted for use with a coaxial cable.

18. The cable grounding kit of claim 1, wherein said cable grounding kit is adapted for use with a waveguide.

19. A kit for electrically grounding a transmission line cable, said cable having a portion of its outer jacket removed revealing an exposed section of an electrical conductor, said cable grounding kit comprising:

- a metallic grounding clip having a fulcrum portion and means for connecting said grounding clip to a ground wire, said grounding clip encompassing a pan of said exposed section of said electrical conductor;

a bail having a mounting element pivotably mounted on said fulcrum portion of said grounding clip for permitting rotation of said bail between an open position and a closed position, said bail contacting said grounding clip and forcing said grounding clip into clamping engagement with said exposed section of said electrical conductor in response to said bail being rotated to said closed position; and means for sealing said exposed section of said electrical conductors, said grounding clip, and said bail, said sealing means including exiting means for said ground wire, said sealing means including tape.

20. The cable grounding kit of claim 19, wherein said grounding clip directly contacts a part of said exposed section of said electrical conductor.

21. The cable grounding kit of claim 19, wherein said fulcrum is integral with said grounding clip.

22. An assembly for attaching a ground wire to a transmission cable, said transmission cable having a portion of its outer jacket removed revealing an exposed section of an electrical conductor, said transmission cable grounding assembly comprising:

a grounding clip including an integral fulcrum portion adjacent to said transmission cable and means for connecting said ground wire to said grounding clip, said grounding clip encompassing and directly contacting a part of said exposed section of said electrical conductor, said grounding clip having a cross-sectional profile that is C-shaped; and a bail having a mounting element, said mounting element being pivotably mounted on said fulcrum portion for permitting rotation of said bail between an open position and a closed position, said bail contacting said grounding clip and forcing said grounding clip into clamping engagement with said exposed section of said electrical conductor in response to said bail being rotated to said closed position, said bail partially circumscribing at least a portion of said transmission cable in said closed position.

23. The transmission cable grounding assembly of claim 22, wherein said grounding clip is made of metal.

24. The transmission cable grounding assembly of claim 22, wherein said grounding clip encompasses from about 60% to 80% of said electrical conductor in the circumferential direction.

25. The transmission cable grounding assembly of claim 22, wherein said connecting means includes a substantially flat embossment displaced in the radial direction from said electrical conductor to which said ground wire is coupled.

26. The transmission cable grounding assembly of claim 25, wherein said connecting means further includes a tube and at least two rivets, said rivets connecting said tube to said embossment, said ground wire being crimped into one end of said tube.

27. The transmission cable grounding assembly of claim 22, wherein said grounding clip has an inner diameter and said electrical conductor of said transmission cable has an outer diameter, said inner diameter of said grounding clip being less than said outer diameter of said electrical conductor.

28. The transmission cable grounding assembly of claim 22, wherein said fulcrum portion of said grounding clip includes a cylindrical cavity and said mounting element of said bail includes two arms, each of said two arms being inserted into a corresponding end of said cylindrical cavity.

29. The transmission cable grounding assembly of claim 22, wherein said grounding clip is made of a material selected from the group consisting of copper 151, copper 110, and copper 143.

30. The transmission cable grounding assembly of claim 22, wherein said bail has a C-shaped side profile, said C-shaped profile of said bail extending in the range from about 180° to about 210° around said electrical conductor.

31. The transmission cable grounding assembly of claim 30, wherein said C-shaped side profile of said bail has an inner diameter and said grounding clip has an outer diameter, said inner diameter being approximately the same as said outer diameter.

32. The transmission cable grounding assembly of claim 22, wherein said bail includes a handle, said handle being disposed on said bail away from said mounting element, said handle capable of being rotated to effectuate the transition between said open position and said closed position.

33. The transmission cable grounding assembly of claim 32, wherein said bail has a curved member extending from said mounting element to said handle, said curved member having substantially the same curvature as said electrical conductor, a part of said curved member forcing said grounding clip into clamping engagement with said electrical conductor.

34. The transmission cable grounding assembly of claim 22, wherein said bail is made from steel.

35. The transmission cable grounding assembly of claim 22, wherein said transmission cable grounding assembly is adapted for use with a coaxial cable.

36. The transmission cable grounding assembly of claim 22, wherein said transmission cable grounding assembly is adapted for use with a waveguide.

37. A method of providing electrical grounding to an electrical conductor of a transmission cable, said method comprising the steps of:

exposing a section of said electrical conductor;

providing a grounding assembly including a metallic grounding clip and a bail, said metallic grounding clip having a connector coupled to a ground wire and a fulcrum portion, said metallic grounding clip having a C-shaped cross-sectional profile with an axial opening, said bail having a mounting element being pivotably mounted on said fulcrum portion of said metallic grounding clip;

placing said metallic grounding clip around said exposed section of said electrical conductor including the step of forcing, said electrical conductor of said transmission cable through said axial opening; and rotating said bail to a closed position wherein said bail contacts said metallic grounding clip and forces said metallic grounding clip into clamping engagement with said exposed section of said electrical conductor.

38. The method of claim 37, wherein said bail includes a handle, and said step of rotating said bail includes said step of gripping said handle.

39. The method of claim 37, further including the step of sealing said grounding assembly along said cable.

40. The method of claim 37, wherein said transmission cable is a coaxial cable.

41. The method of claim 37, wherein said transmission cable is a waveguide.

42. A method of providing an environmentally-sealed electrical grounding to an electrical conductor of a transmission cable, said method comprising the steps of:

exposing a section of said electrical conductor;

providing a grounding kit including a grounding clip, a bail, and a hollow housing, said grounding clip including a connector coupled to a ground wire and a fulcrum portion, said bail having a mounting element pivotably mounted on said fulcrum portion for permitting rotation of said bail, said hollow housing having openings at both ends and an exit port, said ground wire exiting said housing through said exit port;

placing said grounding clip around said exposed section of said electrical conductor;

rotating said bail to a closed position wherein said bail contacts said grounding clip and forces said grounding clip into clamping engagement with said exposed section of said electrical conductor; and encasing said grounding clip, said bail, and said exposed section of said electrical conductor with said hollow housing, said cable adjacent said exposed section exiting said housing through said openings.

43. A method of claim 41, wherein said step of encasing said grounding clip, said bail and said exposed section of said electrical conductor includes the steps of:

opening said housing along an axial seam;

inserting said grounding clip, said bail and said electrical conductor into said axial seam; and closing said housing along said axial seam.

44. A method of claim 43, wherein said axial seam defines two opposing surfaces, one of said two opposing surfaces having a projection and the other of said two opposing surfaces having a groove, said steps of opening said housing and closing said housing include, respectively, the steps of removing said projection from said groove and inserting said projection into said groove.

45. A method of claim 41, wherein said housing includes at least one strap having a ratcheting mechanism, and said method further includes the step of clamping said housing with said at least one strap by tightening said strap with said ratcheting mechanism.

46. A method of claim 41, wherein said ground wire is press fitted into said exit port, said grounding clip and said bail being retained to said housing by said press fit engagement between said ground wire and said exit port.

47. An assembly for attaching a ground wire to a transmission cable, said transmission cable having a portion of its outer jacket removed revealing an exposed section of an electrical conductor, said transmission cable grounding assembly comprising:

a grounding clip including an integral fulcrum portion adjacent to said transmission cable and means for connecting said ground wire to said grounding clip, said grounding clip encompassing and directly contacting a part of said exposed section of said electrical conductor, said connecting means including a substantially flat embossment displaced in the radial direction from said electrical conductor to which said ground wire is coupled; and a bail having a mounting element, said mounting element being pivotably mounted on said fulcrum portion for permitting rotation of said bail between an open position and a closed position, said bail contacting said grounding clip and forcing said grounding clip into clamping engagement with said exposed section of said electrical conductor in response to said bail being rotated to said closed position, said bail partially circumscribing at least a portion of said transmission cable in said closed position.

48. The transmission cable grounding assembly of claim 47, wherein said connecting means further includes at least one rivet for attaching said ground wire to said flat embossment.

49. The transmission cable grounding assembly of claim 47, wherein said grounding clip includes a recessed section which defines said flat embossment, said recessed section creating a gap between said flat embossment and said exposed section of said conductor.

50. An assembly for attaching a ground wire to a transmission cable, said transmission cable having a portion of its outer jacket removed revealing an exposed section of an electrical conductor, said transmission cable grounding assembly comprising:

a grounding clip including an integral fulcrum portion adjacent to said transmission cable and means for connecting said ground wire to said grounding clip, said grounding clip encompassing and directly contacting a part of said exposed section of said electrical conductor, said grounding clip having an inner diameter and said electrical conductor of said transmission cable having an outer diameter, said inner diameter of said grounding clip being less than said outer diameter of said electrical conductor; and a bail having a mounting element, said mounting element being pivotably mounted on said fulcrum portion for permitting rotation of said bail between an open position and a closed position, said bail contacting said grounding clip and forcing said grounding clip into clamping engagement with said exposed section of said electrical conductor in response to said bail being rotated to said closed position, said bail partially circumscribing at least a portion of said transmission cable in said closed position.

51. The transmission cable grounding assembly of claim 50, wherein said inner diameter of said grounding clip is from about 0.005 inch to about 0.050 inch less than said outer diameter of said electrical conductor.

52. The transmission cable grounding assembly of claim 50, wherein said grounding clip is made entirely of metal.

53. The transmission cable grounding assembly of claim 50, wherein said grounding clip extends circumferentially around said electrical conductor by greater than 180°.

54. An assembly for attaching a ground wire to a transmission cable, said transmission cable laving a portion of its outer jacket removed revealing an exposed section of an electrical conductor, said transmission cable grounding assembly comprising:

a grounding clip including an integral fulcrum portion adjacent to said transmission cable and means for connecting said ground wire to said grounding clip, said grounding clip encompassing and directly contacting a part of said exposed section of said electrical conductor, said fulcrum portion of said grounding clip including a cylindrical cavity; and a bail having a mounting element, said mounting element being pivotably mounted on said fulcrum portion for permitting rotation of said bail between an open position and a closed position, said bail contacting said grounding clip and forcing said grounding clip into clamping engagement with said exposed section of said electrical conductor in response to said bail being rotated to said closed position, said bail partially circumscribing at least a portion of said transmission cable in said closed position, said mounting element of said bail including two arms each of which is inserted into a corresponding end of said cylindrical cavity.

55. The transmission cable grounding assembly of claim 54, wherein said cylindrical cavity is defined by an end portion of said grounding clip being formed into a cylindrical shape.

56. The transmission cable grounding assembly of claim 54, wherein said arms project toward each other.

57. The transmission cable grounding assembly of claim 54, wherein said bail is made entirely of metal.

58. The transmission cable grounding assembly of claim 54, wherein said grounding clip has a cross-sectional profile that is C-shaped.

* * * * *